Oct. 20, 1931. T. E. FORSTER 1,828,247
APPARATUS FOR DISLODGING HARD PRESSED FLOUR FROM BRAN
Filed Feb. 27, 1930 2 Sheets-Sheet 1
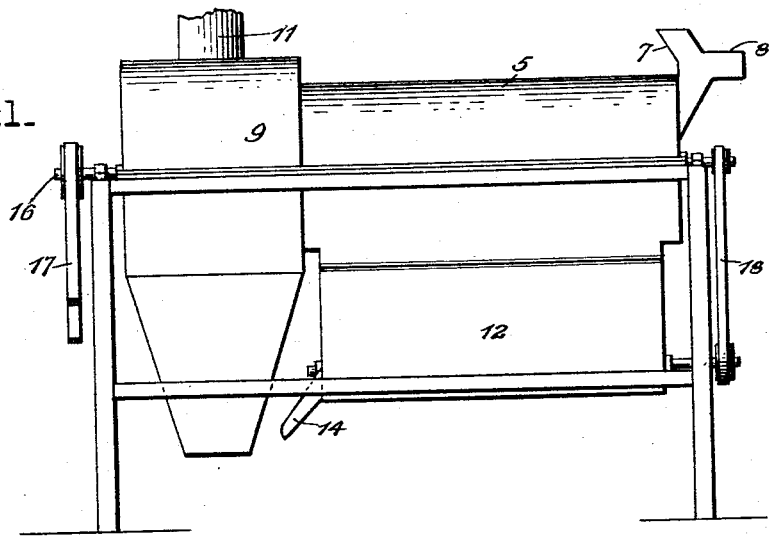
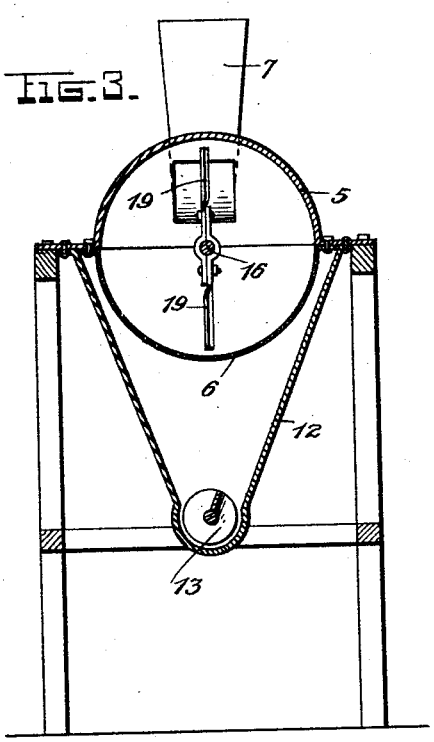
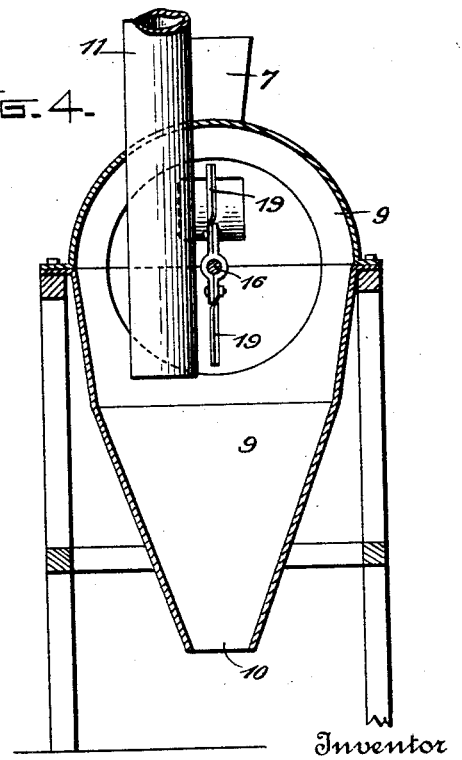
Inventor
Thomas E. Forster

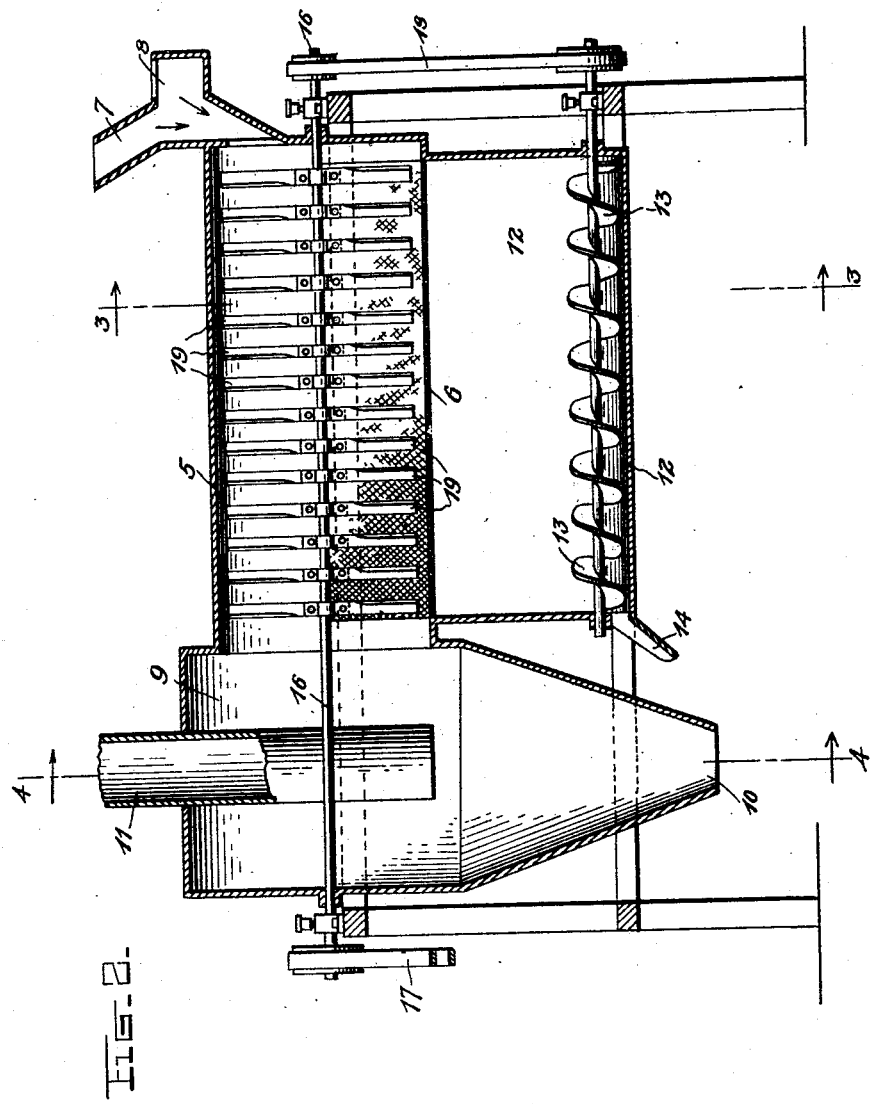

Patented Oct. 20, 1931

1,828,247

UNITED STATES PATENT OFFICE

THOMAS EDGAR FORSTER, OF WICHITA, KANSAS

APPARATUS FOR DISLODGING HARD-PRESSED FLOUR FROM BRAN

Application filed February 27, 1930. Serial No. 431,832.

In the milling industry, difficulty has heretofore been encountered in removing all of the hard-pressed flour from the bran. This flour is in hard thin cakes upon the individual flakes of bran and the two adhere very tenaciously, due to the contained moisture and the pressure under which they have been united. The bran, when it leaves the last brake roll, is warm, often at a temperature of ninety degrees or more and there is about fourteen percent moisture in the bran. It is my opinion that both the temperature and the moisture of the bran and the hard-pressed flour thereon, as well as the pressure by which flour and bran are united, are factors in the tenacious union between the bran and the flour. I have found however that by a unique centrifugal machine, in which the united bran and flour are violently whirled in the presence of air, cooling of the bran and flour takes place, and the relatively heavy flour is liberated from the comparatively light bran, by centrifugal force.

I am aware that mills now make use of bran dusters in which the flour-coated bran is worked against screens by revolving brushes. This way of removing the flour from the bran while saving a great deal of the former, still leaves about two or three percent upon the bran. With the use of my machine however, all flour is stripped from the bran and hence a great saving effected. Moreover, there is practically nothing about the improved apparatus to require repair or replacement, whereas with the conventional bran dusters, new brushes must be installed at least once a year. In addition to this advantage over the present day bran duster, fifty percent more output may be obtained with the improved process and apparatus, with the expenditure of only about one-half of the power.

Fig. 1 of the accompanying drawings illustrates a side elevation of a preferred form of apparatus.

Fig. 2 is a vertical longitudinal sectional view.

Figs. 3 and 4 are transverse sectional views on lines 3—3 and 4—4 of Fig. 2.

The numeral 5 denotes a horizontally elongated cylinder whose lower portion is formed by a screen 6, said cylinder having its interior free from projections. This cylinder is provided with an inlet 7 for the flour and bran, and an inlet 8 for air, both disposed at one of its ends. The other end of the cylinder is completely open and is in direct communication with a vertically elongated casing 9 into which the cleaned bran discharges, said casing having a bran outlet 10 at its lower end and being provided with an air escape pipe 11 which extends into its upper end. Under the screened portion of the cylinder 5, is a receiving casing 12 for the flour passing through the screen 6, a screw conveyor 13 being provided for carrying this flour to a discharge spout 14.

Extending longitudinally through the cylinder 5 is a shaft 16 driven by a belt 17 or other desired means and operatively connected, for instance by a belt 18, with the screw conveyor 13. Secured to and radiating from the shaft 16 within the cylinder 5 are a plurality of flat paddles 19 adapted to centrifugally throw all air, bran and flour entering the cylinder.

The shaft 16 is driven at a speed of from 2000 to 3000 R. P. M. and during such rotation the bran with the hard-pressed flour adhering, is fed to the cylinder through the inlet 7, a quantity of air also entering through the inlet 8. All of the air, bran and flour is violently whirled by the paddles 19 and hence centrifugally thrown, and it is this centrifugal action which loosens the flour from the bran, augmented of course by the beating action of the paddles 19 and the drying action of the air. The centrifugal travel of the bran is limited by the cylinder 5 and its screen 6 but the liberated, relatively heavy flour, passes on by centrifugal force through said screen 6 into the receiving casing 12. The rapidly rotating paddles 19 act somewhat in the capacity of a blower, in that they centrifugally move the air. While some of this air can escape through the screen 6, its course of least resistance is through the open end of the cylinder 5 into the casing 9 and then through the air escape pipe 11. In traveling in this manner, the air current carries the bran into the casing 9, the bran falling to the lower end of the latter and discharging while the air escapes through the pipe 11.

Particular attention is invited to the smooth imperforate section 5 of the cylinder and the screened section 6, both of said sections being semi-cylindrical and having a common radius. By this construction, when the flour-laden bran is centrifugally held against the cylinder wall and caused to travel around the latter, said bran repeatedly slides alternately upon the smooth cylinder section 5 and the screened cylinder section 6. As it slides along the screen 6, the bran necessarily experiences a decrease in speed, but as the bran slides upon the smooth section 5, it correspondingly increases its speed. Hence, it is insured that the speed of the whirling bran shall not be so decreased as to prevent it from properly following the cylinder from inlet to outlet. Were such a decrease allowed, the bran would merely settle upon the screen 6 and would simply be kicked each time the arms 9 approached.

It will be seen from the foregoing that the improved process and apparatus are rapid, efficient and in every way desirable. The details disclosed are preferably followed, but within the scope of the invention as claimed, variations may be made.

I claim:—

In a machine for removing hard-pressed flour from bran, a horizontal cylinder having a smooth imperforate semi-cylindrical section and a screened semi-cylindrical section, said sections having a common radius, one end of said cylinder having an inlet for air and flour-laden bran, the other end of said cylinder being open, a bran-collecting chamber with which said open end of the cylinder directly communicates, the lower end of said chamber having a bran outlet, an air outlet conduit extending from a point within said chamber to the exterior of the latter, and means extending longitudinally within and out of contact with said cylinder for violently whirling the air and flour-laden bran, causing the latter to be centrifugally held against the cylinder wall and to repeatedly slide alternately upon said smooth cylinder section and said screened cylinder section, thereby insuring that each decrease in the speed of the bran incident to travel upon said screened section, shall be followed by an increase in the speed of the bran while the latter travels upon said smooth section.

In testimony whereof I have hereunto affixed my signature.

THOMAS EDGAR FORSTER.